3,019,230
METHOD FOR THE PREPARATION OF 2,4-DIOXO-TETRAHYDROPYRIDINES

Rudolf Hinderling, Riehen, and August Hans Lutz and Otto Schnider, Basel, Switzerland, assignors to Hoffmann-La Roche Inc., Nutley, N.J., a corporation of New Jersey
No Drawing. Filed Jan. 4, 1960, Ser. No. 3
Claims priority, application Switzerland Feb. 6, 1959
9 Claims. (Cl. 260—297)

This invention relates to an improved method for the preparation of 2,4-dioxo-tetrahydropyridines, especially 2,4-dioxo-tetrahydropyridines containing one or two substituents in the 3-position.

Tht invention comprises reacting a compound having the formula

I

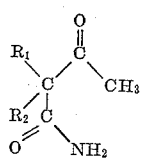

wherein $R_1$ and $R_2$ each represents alkyl or alkenyl and $R_2$ represents in addition hydrogen, with an organic carboxylic acid ester in the presence of an alkaline condensation agent. Since this reaction, being carried out in alkaline medium, results in a salt, the free base may be obtained, if desired, by neutralization with an acid.

The acetoacetamides, answering to structural Formula I, used as starting materials may bear one or two substituents in the α-position as indicated by the symbols $R_1$ and $R_2$. The substituents represented by $R_1$ and $R_2$ include straight chain or branched chain aliphatic groups, for example, alkyl groups such as methyl, ethyl, n-propyl, isopropyl, amyl, or the like, or alkenyl groups such as allyl. Preferred are lower alkyl or lower alkenyl groups.

The amides used as starting materials may be produced, for example, by alkylating acetoacetamide. α-Substituted acetoacetic acid amides are a known class of compounds which may be produced by treating the corresponding substituted acetoacetic acid esters with ammonia. The α-di-substituted acetoacetic acid amides may be obtained by alkylating the α-monosubstituted compounds.

Organic carboxylic acid esters used to react with the acetoacetamide include esters of aliphatic acids such as the fatty acid series, e.g. lower alkanoic acids or oxalic acid. The esters are preferably alkyl esters, especially lower alkyl esters. Illustrative esters include methyl formate, ethyl formate, methyl acetate, ethyl acetate and the like. When an ester of formic acid is used, then the 6-position of the resulting 2,4-dioxo-tetrahydropyridine is unsubstituted. However, when an ester of other carboxylic acids is used, then the hydrocarbon substituent of the particular acid used appears in the 6-position as illustrated by Example 3 which follows.

According to this invention, the substituted acetoacetamide having the Formula I is admixed with an organic carboxylic acid ester, preferably in an inert organic solvent, in the presence of an alkali metal condensation agent. The reaction occurs under very mild conditions and, in general, takes place at room temperature. It is advantageous to use an excess of ester and condensation agent, for example, about two mols of carboxylic acid ester and about two mols of alkali metal condensation agent for each mol of acetoacetamide.

According to a preferred modification, a freshly prepared suspension of the carboxylic acid ester and the alkali metal condensation agent in an inert solvent is prepared. Then a solution of the acetoacetamide in a solvent (preferably the same solvent) is introduced into the suspension which contains the ester and condensation agent and which is maintained at a temperature of about 20 to 30° C.

The condensation products formed are alkali metal salts of the 2,4-dioxo-tetrahydropyridine. If the free base is desired, then the reaction product is neutralized with an excess of acid and the corresponding substituted 2,4-dioxo-tetrahydropyridine is obtained. The acidification may be effected by using an organic acid, e.g. an acid of the fatty acid series such as acetic acid, or an inorganic acid, e.g. a mineral acid such as sulfuric acid or hydrochloric acid.

The condensation agents are alkali metals or alkali metal compounds. Pulverulent sodium, for example, may be used. Preferred alkali metal compounds are alkali metal alcoholates such as those derived by reaction of an alkali metal with a lower alkanol. Sodium methylate is especially suitable.

The use of a solvent for the reaction is optional. Any inert organic solvent may be used, preferably one which is water immiscible. Ether, and especially aromatic hydrocarbons such as benzene and toluene, are particularly useful.

The products synthesized according to this invention include compounds which are useful as sedatives, hypnotics or anticonvulsants.

The following examples are illustrative of this invention. Temperatures are stated in degrees centigrade.

Example 1

108 g. of sodium methylate were suspended in 500 ml. of toluene. 120 g. of methyl formate were dropped into the sodium methylate suspension thus formed at a rate so that temperature did not exceed 30°. Thereafter a solution of 157 g. of α,α-diethyl-acetoacetamide in 500 ml. of toluene were added so that the temperature did not exceed 50°. The mixture was stirred for one hour at 50° and then overnight at room temperature. The reaction mixture was poured into 700 ml. of ice water, permited to stratify, the aqueous layer was separated, covered with a layer of 200 ml. of toluene and then treated while stirring with 200 g. of 50% sulfuric acid. Finally the reaction mixture, which was acid to congo red, was warmed at 50° and the toluene-containing layer was separated. The aqueous layer was extracted with four 200 ml. portions of toluene at 50° and then discarded. The toluene extracts were combined and then concentrated in vacuo at 60°. There were obtained 135 g. of crystalline residue which was recrystallized from 200 ml. of toluene. The 3,3-diethyl-2,4-dioxo-1,2,3,4-tetrahydropyridine thus obtained melted at 96°.

The α,α-diethyl-acetoacetamide used as starting material was obtained by converting diketene with aqueous ammonia to acetoacetamide and alkylating twice with ethyl bromide in the presence of sodium alcoholate.

By following the procedure described in the first paragraph there were obtained in addition, 3,3-diallyl-2,4-dioxo-1,2,3,4-tetrahydropyridine, M.P. 72°, from α,α-diallyl-acetoacetamide, and 3,3-di-n-propyl-2,4-dioxo-1,2,3,4-tetrahydropyridine, M.P. 93°, from α,α-di-n-propylacetoacetamide.

Example 2

143. g. of α-isopropyl-acetoacetamide were dissolved in boiling toluene and added to a freshly prepared suspension of 90 g. of methyl formate and 130 g. of sodium methylate in toluene. The sodium salt of 3-isopropyl-2,4-dioxo-1,2,3,4-tetrahydropyridine which formed was washed with water and directly made acid to congo red with hydrochloric acid. From the aqueous solution colorless crystals of 3-isopropyl-2,4-dioxo-1,2,3,4-tetrahydropyridine precipitated, M.P. 255°, yield 107 g.

*Example 3*

185 g. of α,α-di-n-propyl-acetoacetamide were dissolved in one liter of absolute toluene with warming and the solution was treated with 160 g. of sodium methylate. Over the course of one-half hour, 250 g. of methyl acetate were added at about 35°. When the reaction came to an end the sodium salt of 3,3-di-n-propyl-2,4-dioxo-6-methyl-1,2,3,4-tetrahydropyridine was extracted with water and with sodium hydroxide, then directly made acid with sulfuric acid and extracted with ethyl acetate. The ethyl acetate extract was dried and then concentrated. The residue was crystallized from benzene-petroleum ether to obtain 84 g. of 3,3-di-n-propyl-2,4-dioxo-6-methyl-1,2,3,4-tetrahydropyridine, M.P. 102°.

We claim:
1. A method for the preparation of 2,4-dioxo-1,2,3,4-tetrahydropyridines which comprises reacting a compound having the formula

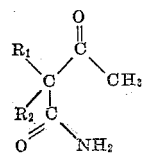

wherein $R_1$ represents a member of the group consisting of alkyl and alkenyl and $R_2$ represents a member of the group consisting of hydrogen, alkyl and alkenyl, with a lower alkyl ester of a lower alkanoic acid in the presence of an agent selected from the group consisting of alkali metals and alkali metal alcoholates.

2. A process for the preparation of 2,4-dioxo-1,2,3,4-tetrahydropyridines which comprises reacting a compound having the formula

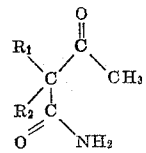

wherein $R_1$ represents a member of the group consisting of alkyl and alkenyl and $R_2$ represents a member of the group consisting of hydrogen, alkyl and alkenyl, with a lower alkyl ester of a lower alkanoic acid in the presence of an agent selected from the group consisting of alkali metals and alkali metal alcoholates and neutralizing the condensation product with acid.

3. A process for the preparation of 3-lower alkyl-2,4-dioxo-1,2,3,4-tetrahydropyridines which comprises reacting α-lower alkyl-acetoacetamide with an excess of a lower alkyl ester of a lower alkanoic acid in the presence of an excess of alkali metal alcoholate in an inert, organic, water-immiscible solvent.

4. A process for the preparation of 3,3-di-lower alkyl-2,4-dioxo-1,2,3,4-tetrahydropyridines which comprises reacting α,α-di-lower alkyl-acetoacetamide with an excess of a lower alkyl ester of a lower alkanoic acid in the presence of an excess of alkali metal alcoholate in an inert, organic, water-immiscible solvent.

5. A process for the preparation of 3,3-di-lower alkenyl-2,4-dioxo-1,2,3,4-tetrahydropyridines which comprises reacting α,α-di-lower alkenyl-acetoacetamide with an excess of a lower alkyl ester of a lower alkanoic acid in the presence of an excess of alkali metal alcoholate in an inert, organic, water-immiscible solvent.

6. A process for the preparation of 3,3-diethyl-2,4-dioxo-1,2,3,4-tetrahydropyridine which comprises reacting α,α-diethyl-acetoacetamide with an excess of methyl formate in the presence of an excess of sodium methylate in toluene and neutralizing the reaction product with sulfuric acid.

7. A process for the preparation of 3-isopropyl-2,4-dioxo-1,2,3,4-tetrahydropyridine which comprises reacting α-isopropyl-acetoacetamide with an excess of methyl formate in the presence of an excess of sodium methylate in toluene and neutralizing the reaction product with hydrochloric acid.

8. A process for the preparation of 3,3-di-n-propyl-2,4-dioxo-6-methyl-1,2,3,4-tetrahydropyridine which comprises reacting α,α-di-n-propyl-acetoacetamide with an excess of methyl acetate in the presence of an excess of sodium methylate in toluene and neutralizing the reaction product with sulfuric acid.

9. A process for the preparation of 3,3-diallyl-2,4-dioxo-1,2,3,4-tetrahydropyridine which comprises reacting α,α-diallyl-acetoacetamide with an excess of methyl formate in the presence of an excess of sodium methylate in toluene and neutralizing the reaction product with sulphuric acid.

References Cited in the file of this patent
FOREIGN PATENTS
457,012    Great Britain _____ Nov. 19, 1936

OTHER REFERENCES

Benary et al.: Ber. Deut. Chem., vol. 59, page 110 (1926).

Klingsberg: "Pyridine and its Deriv." (Interscience), Pt. one, page 286, 1960.